(12) United States Patent
Yamamoto et al.

(10) Patent No.: US 7,289,645 B2
(45) Date of Patent: Oct. 30, 2007

(54) HAND PATTERN SWITCH DEVICE

(75) Inventors: Keiichi Yamamoto, Yokohama (JP); Hiromitsu Sato, Yokohama (JP); Hideo Saito, Yokohama (JP); Shinji Ozawa, Yokohama (JP); Hiroya Igarashi, Yokohama (JP)

(73) Assignees: Mitsubishi Fuso Truck and Bus Corporation (JP); Keio University (JP)

( * ) Notice: Subject to any disclaimer, the term of this patent is extended or adjusted under 35 U.S.C. 154(b) by 625 days.

(21) Appl. No.: 10/694,430

(22) Filed: Oct. 27, 2003

(65) Prior Publication Data

US 2004/0141634 A1    Jul. 22, 2004

(30) Foreign Application Priority Data

Oct. 25, 2002  (JP)  .............................. 2002-311289
Oct. 25, 2002  (JP)  .............................. 2002-311290

(51) Int. Cl.
*G06K 9/00*    (2006.01)

(52) U.S. Cl. .................... 382/104; 382/181; 715/863

(58) Field of Classification Search ............. 382/104, 382/181; 345/156; 715/863; 348/169; 340/907, 933
See application file for complete search history.

(56) References Cited

U.S. PATENT DOCUMENTS

| | | | |
|---|---|---|---|
| 5,203,704 A | | 4/1993 | McCloud |
| 5,454,043 A | | 9/1995 | Freeman |
| 5,594,469 A | * | 1/1997 | Freeman et al. ............. 345/158 |
| 5,815,147 A | * | 9/1998 | Bogen et al. ................ 715/835 |
| 6,128,003 A | * | 10/2000 | Smith et al. ................ 345/157 |
| 6,359,612 B1 | * | 3/2002 | Peter et al. ................. 345/156 |
| 6,434,255 B1 | * | 8/2002 | Harakawa ................... 382/103 |
| 6,564,144 B1 | * | 5/2003 | Cherveny ................... 701/208 |
| 6,766,036 B1 | * | 7/2004 | Pryor .......................... 382/103 |

(Continued)

FOREIGN PATENT DOCUMENTS

DE    3836555 A1    5/1990

(Continued)

OTHER PUBLICATIONS

Relevant portion of German Office Action of corresponding German Application DE 103 49 568.1-53.

(Continued)

*Primary Examiner*—Joseph Mancuso
*Assistant Examiner*—Andrae Allison
(74) *Attorney, Agent, or Firm*—Rossi, Kimms & McDowell LLP

(57) ABSTRACT

A hand pattern switch device recognizes a hand pattern from an image of a hand in an image pickup zone and detects a hand motion. One of controlled objects is selected based on the recognized hand pattern and/or hand motion. In accordance with the selected object, a mode of detection of operation information based on hand motion is changed. In a moved distance detecting mode, a moved distance of the hand in the zone is detected as operation information, and in a stop time detecting mode, a stop time of the hand at a stop position to which the hand has been moved in the zone is detected as operation information. The image pickup zone is at a location which is located laterally to a steering wheel and to which a driver can extend his/her arm without changing a driving posture.

13 Claims, 11 Drawing Sheets

U.S. PATENT DOCUMENTS

| | | | |
|---|---|---|---|
| 6,804,396 B2 * | 10/2004 | Higaki et al. | 382/181 |
| 6,819,782 B1 * | 11/2004 | Imagawa et al. | 382/115 |
| 6,950,534 B2 * | 9/2005 | Cohen et al. | 382/103 |
| 7,050,606 B2 * | 5/2006 | Paul et al. | 382/104 |
| 2002/0036617 A1 | 3/2002 | Pryor | |
| 2002/0041260 A1 | 4/2002 | Grassmann | |
| 2002/0057383 A1 | 5/2002 | Iwamura | |
| 2002/0126876 A1 | 9/2002 | Paul et al. | |
| 2003/0214524 A1 * | 11/2003 | Oka | 345/700 |
| 2005/0063564 A1 | 3/2005 | Yamamoto et al. | |

FOREIGN PATENT DOCUMENTS

| | | |
|---|---|---|
| DE | 19654944 A1 | 6/1998 |
| DE | 19845030 A1 | 4/2000 |
| DE | 10039432 C1 | 12/2001 |
| DE | 103 49 568 A1 | 5/2004 |
| EP | 0 749 098 A2 | 12/1996 |
| JP | 9-206473 A | 8/1997 |
| JP | 11-24839 A | 1/1999 |
| JP | 11-134090 * | 5/1999 |
| JP | 11-134090 A | 5/1999 |
| JP | 2000-293666 A | 10/2000 |
| JP | 2001-216069 A | 8/2001 |

OTHER PUBLICATIONS

Relevant portion of German Office Action of corresponding German Application DE 10 2005 088 221.1.

Specification and claims of related co-pending U.S. Appl. No. 11/064,428, filed in Japanese, however, herewith an English translation is provided.

Notice on Office Action from the Patent Office of the People's Republic of China, dated May 27, 2005, for a counterpart foreign application.

Notification of Reasons for Rejection, dated Nov. 8, 2005, issued in JP Application No. 2004-052014, from which related U.S. Appl. No. 11/064,428 claims priority.

German Office Action for corresponding German application DE 10 2004 038 965.9.

Akyol, Suat et al.; "Gestensteuerung für Fahrzeugbordsysteme"; DAGM-Symposium; Sep. 13-15, 2000; p. 139-146; Germany.

German Office Action issued Feb. 13, 2007 for corresponding German Patent Application No. 10349568. 1-53.

* cited by examiner

HAND PATTERN 1

HAND PATTERN 2

HAND PATTERN 3

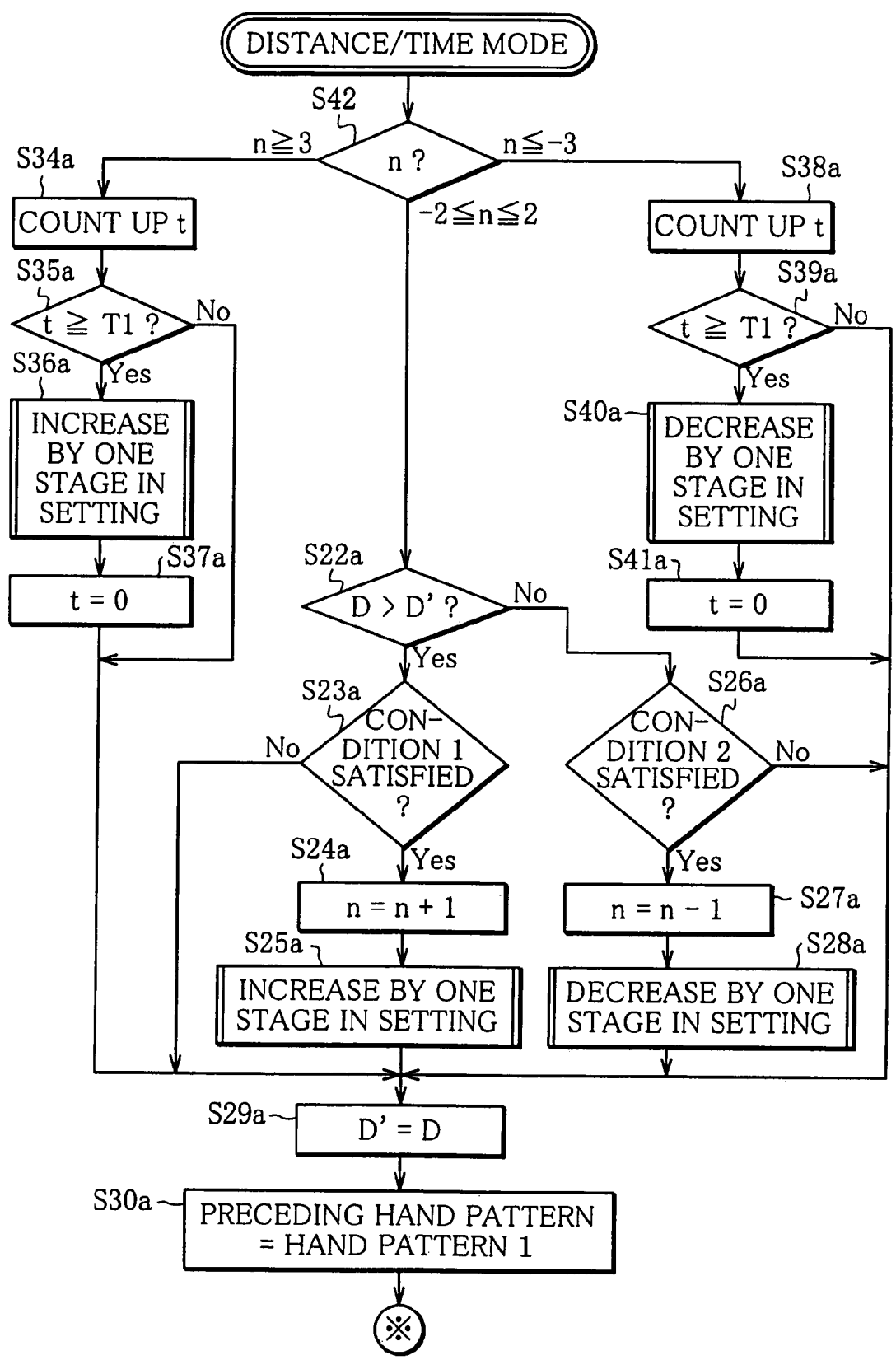

HAND PATTERN SWITCH DEVICE

BACKGROUND OF THE INVENTION

1. Technical Field

The present invention relates to a hand pattern switch device through which an operator inputs operation information to a controlled object, and more particularly, to a hand pattern switch device for enabling a driver to easily operate a vehicle-mounted equipment such as air conditioner equipment and audio equipment, without his/her driving being affected and without the need of touching an operation panel of the vehicle-mounted equipment.

2. Related Art

There has been proposed a technical art (for example JP-A-11-134090) to operate vehicle-mounted equipment such as air conditioner equipment and audio equipment without touching an operation panel of the vehicle-mounted equipment, in which an image of a body part (for example, left hand) of a driver is picked up by a camera and subject to pattern recognition to obtain information that is used to operate the vehicle-mounted equipment.

In another proposed technical art (for example JP-A-2001-216069), information used to operate vehicle-mounted equipment is acquired from a driver's gesture such as finger pattern and finger motion.

This kind of art, realized by the pattern recognition to recognize a shape or pattern of a palm, hand, fingers, or the like from a picked-up image thereof or realized by the motion detection to detect a motion of a palm, hand, fingers, or the like by tracing its positional change, is called as a hand pattern switch device in the present specification. Hereinafter, palm, hand, fingers, etc., are collectively referred to as "hand" unless otherwise particularly specified.

As mentioned above, a variety of auxiliary equipment such as audio equipment, air conditioner equipment, etc., are mounted in a vehicle. In addition, each equipment has various adjustment functions. For instance, vehicle-mounted audio equipment such as a radio broadcast receiver, tape player, CD player, etc., each have volume, channel selection, play, and stop functions. Air conditioner equipment has functions of adjusting temperature, wind volume, wind direction, etc.

In both the above-mentioned prior art examples, however, a variety of hand patterns are to be used each of which specifies a corresponding one controlled object, and another hand pattern is used to specify an amount of operation. Thus, an individual driver is required to memorize an extremely large number of hand patterns, and accordingly his/her driving may be hindered.

On the other hand, a hand pattern switch device is only capable of inputting pieces of information each of which is, in general, uniquely determined in accordance with what pattern is formed by a hand or in what way a hand motion is performed, or the like. This poses a problem in properly adjusting respective functions of various switch-operation objects.

Specifically, some controlled objects such as channel selection on radio broadcasting and wind amount are preferable to be subject to a large continuous/stepwise operation, whereas other controlled objects such as temperature and sound volume are preferable to be subject to a continuous fine operation.

Thus, it is preferable that switch-operation information to be input from the hand pattern switch device is made changeable in accordance with for example the preference of a driver or the controlled object, so as to improve operability of the switch device.

It is also important to enable a driver to use a hand pattern switch device, without extra load that may hinder his/her driving, when he/she inputs information to control the operation of vehicle-mounted equipment. Furthermore, it is of course preferable that the operation information can be input easily and appropriately in accordance with which vehicle-mounted equipment serving as a controlled object is to be operated.

SUMMARY OF THE INVENTION

An object of the present invention is to provide a hand pattern switch device, which is excellent in operability, for enabling an operator such as driver to properly input operation information, with ease, to controlled objects through the switch device, which information is used to control operations of the controlled objects such as vehicle-mounted equipment, the hand pattern switch device being in particular suitable to input the operation information in a manner suited to each individual controlled object.

Another object of the present invention is to provide a hand pattern switch device for enabling an operator to input operation information to controlled objects through the switch device, without causing an extra load on the operator.

According to the present invention, there is provided a hand pattern switch device, which has image pickup means for picking up an image of a hand that is within a predetermined image pickup zone and in which a hand pattern is recognized from and a hand motion is detected from the picked-up image to obtain operation information for a controlled object.

A hand pattern switch device, according to one aspect of the present invention, comprises controlled object setting means for selecting one of controlled objects in accordance with the recognized hand pattern and/or the detected hand motion, and detection mode changing means for changing a mode of detection of the operation information based on the hand motion in dependence on which controlled object is selected.

The controlled object setting means may cyclically select one of the controlled objects each time a predetermined hand motion pattern is detected. The detecting mode changing means may include a moved distance detecting mode where a moved distance of the hand in the image pickup zone is detected and used as the operation information, a stop time detecting mode where a stop time of the hand at a stop position, to which the hand has been moved by a predetermined distance or more in the image pickup zone, is detected and used as the operation information, and detection mode setting means for setting at least one of the moved distance detecting mode and the stop time detecting mode. More preferably, the moved distance detecting mode is a mode in which the moved distance of the hand is detected in multi-stage fashion using a predetermined moved distance as a unit of detection.

According to the above-mentioned hand pattern switch device, the mode of detection of operation information that is provided to controlled objects can be set properly for example in accordance with characteristics of controlled objects, the preference or habit of an operator such as driver, or the like. Thus, practical advantages can be achieved such that controlled objects, such as adjustment objects of a variety of vehicle-mounted equipment, can be effectively operated under simplified operations by an operator with reduced load. In particular, since the operation information detecting mode can be changed in accordance with controlled object, the operation information can advantageously be input to any controlled object, irrespective whether the controlled object is preferable to be operated stepwise with a relatively large amount of operation or to be operated continuously with a relatively small amount of operation.

According to another aspect of the present invention, there is provided a vehicular hand pattern switch device, in which an image pickup zone is at a location which is located laterally to a steering wheel of a vehicle and to which a driver who steers the steering wheel can extend his/her arm without changing a driving posture.

The image pickup zone may be at least 50 mm apart from an outer periphery of the steering wheel, and may be a rectangle in shape and may have a size of about 600 mm in a fingertip direction and about 350 mm in a width direction of the driver's hand which is extended. The detection of the hand motion in the image pickup zone may include detecting a 10 mm to 70 mm displacement of a centroid position of the hand, determined from the picked-up image, as a controlled object selection and/or an amount of operation of a controlled object concerned.

According to the aforementioned vehicular hand pattern switch device, operation instruction based on hand pattern and hand motion can be reliably detected, without being affected by a driver's hand motion or arm motion for a driving operation. This is practically advantageous, for example, in that operation information can properly be provided to a desired vehicle-mounted equipment in accordance with detection results. In particular, a hand motion, which is an imaginary operation performed by the driver with a reality while resting his/her arm on a rest arm, can be detected reliably. Thus, the driver's load at the time of operation can be advantageously reduced, for instance.

In a vehicular hand pattern switch device according to still another aspect of this invention, image pickup means is disposed at a location at which the image pickup means can pick up an image of a zone to which a driver who steers a steering wheel of a vehicle can extend his/her arm without changing a driving posture. The image pickup means may be disposed at a ceiling of the vehicle.

With this hand pattern switch device, the driver is enabled to input operation information to the switch device, and to a controlled object concerned, with a reduced load.

A hand pattern switch device according to a further aspect of this invention comprises controlled object selecting means for cyclically selecting one of controlled objects when a predetermined hand motion pattern is repeated, and operation amount changing means for changing an amount of operation of the selected controlled object in accordance with the hand motion.

The hand pattern switch device may include operation start recognizing means for recognizing that an operation of said device is started when it is determined that the recognized hand pattern corresponds to a predetermined first hand pattern, and the controlled object selecting means may select a controlled object in accordance with a motion of the hand whose recognized hand pattern corresponds to a predetermined second hand pattern, after recognizing that the operation of said device is started. The operation start recognizing means may include a confirming means for confirming that the hand of the first hand pattern does not grasp or touch a particular thing and then determining that the operation of said hand pattern switch device is started. Further, the first hand pattern may correspond to one that is formed when the hand grasps a thing, and the second hand pattern may correspond to one that is formed when the hand indicates a thing with its finger. The hand pattern switch device may include start promoting means for promoting start of the operation amount changing means when the recognized hand pattern corresponds to a predetermined third hand pattern and a detected position of the hand in the image pickup zone is not displaced for a predetermined time after the controlled object is selected.

According to the aforementioned hand pattern switch device, a cyclic selection of controlled object can be made by an operator such as driver by, for example, repeatedly performing a hand motion pattern corresponding to a push operation of a button switch with his/her forefinger. Moreover for example, an amount of operation of a gear shift lever can be changed by performing, with the first hand pattern, a hand motion corresponding to an operation of moving the gear shift lever with a hand. In this regard, in the technical arts disclosed in JP-A-11-134090 and JP-A-2001-216069, each individual finger pattern is assigned to a corresponding one controlled object, and another finger pattern is assigned to determination of amount of operation. For this reason, the driver must memorize a large number of finger patterns, and hence his/her driving may be hindered.

BRIEF DESCRIPTION OF THE DRAWINGS

FIG. 11 is a flowchart showing procedures for switch-operation information detection in a distance/time mode;

DETAILED DESCRIPTION

A hand pattern switch device according to an embodiment of this invention will be explained with reference to the drawings. In the following, palm, hand, fingers, etc. are collectively referred to as "hand," unless otherwise particularly specified.

[Overall Construction]

Figure 1:
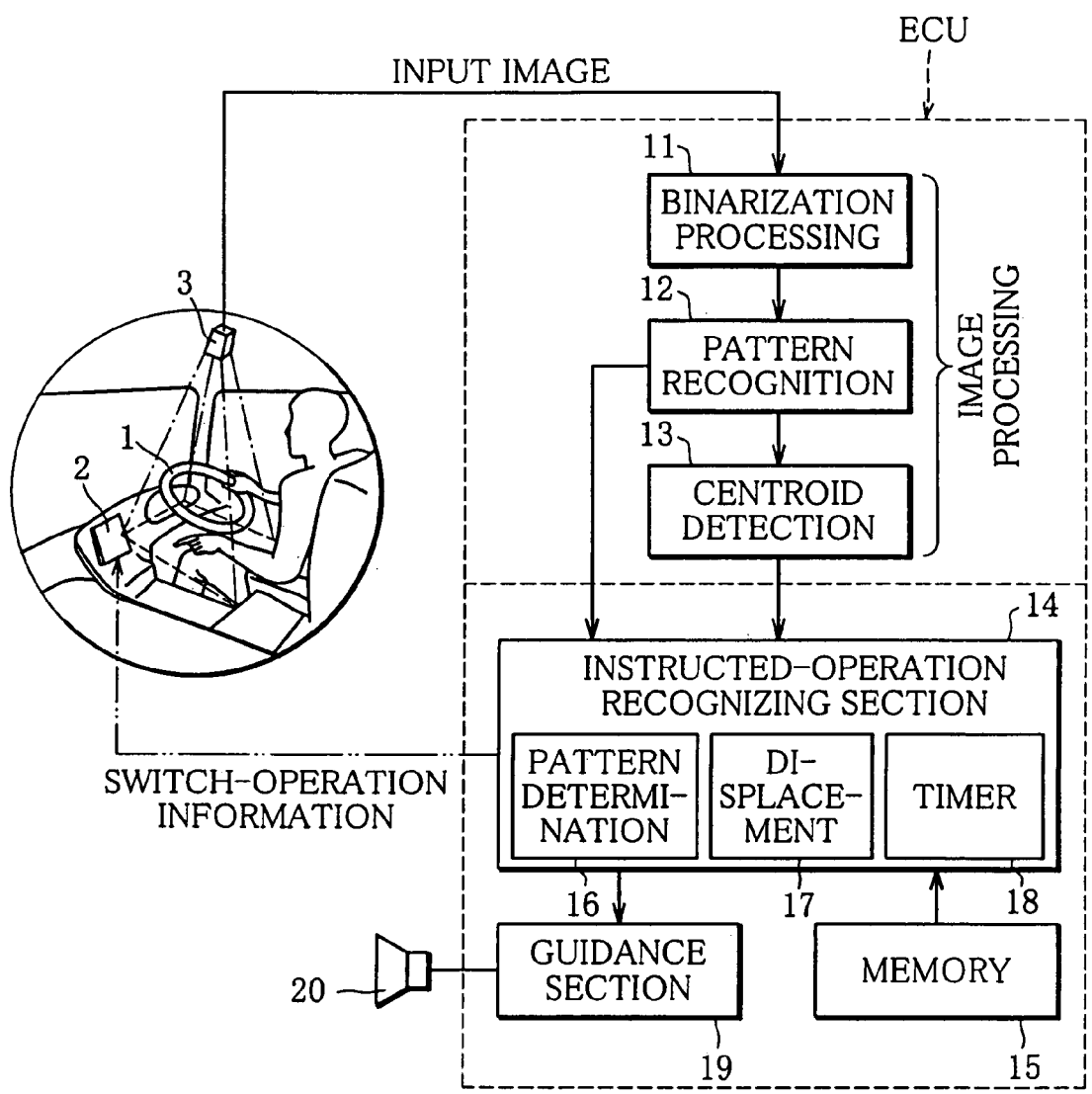
FIG. 1 is a view showing a general construction of a hand pattern switch device according to an embodiment of this invention.

FIG. 1 is a view of a general construction of essential part of the hand pattern switch device according to the present embodiment, showing a state around a driver's seat of a truck and functions of the switch device realized for example by a microcomputer (ECU) and the like. Near the driver's seat, a steering wheel 1 steered by a driver, a combination switch (not shown), etc. are provided, whereas an operating section 2 for audio equipment, air conditioner equipment, etc., serving as controlled objects, is provided on a console panel. At a ceiling located above the driver's seat, a video camera 3 is disposed for picking up an image of fingers of a driver who extends his/her hand to an image pickup zone located laterally to the steering wheel 1. The camera 3 is comprised of a small-sized CCD camera or the like.

[Camera Arrangement]

Figure 2:
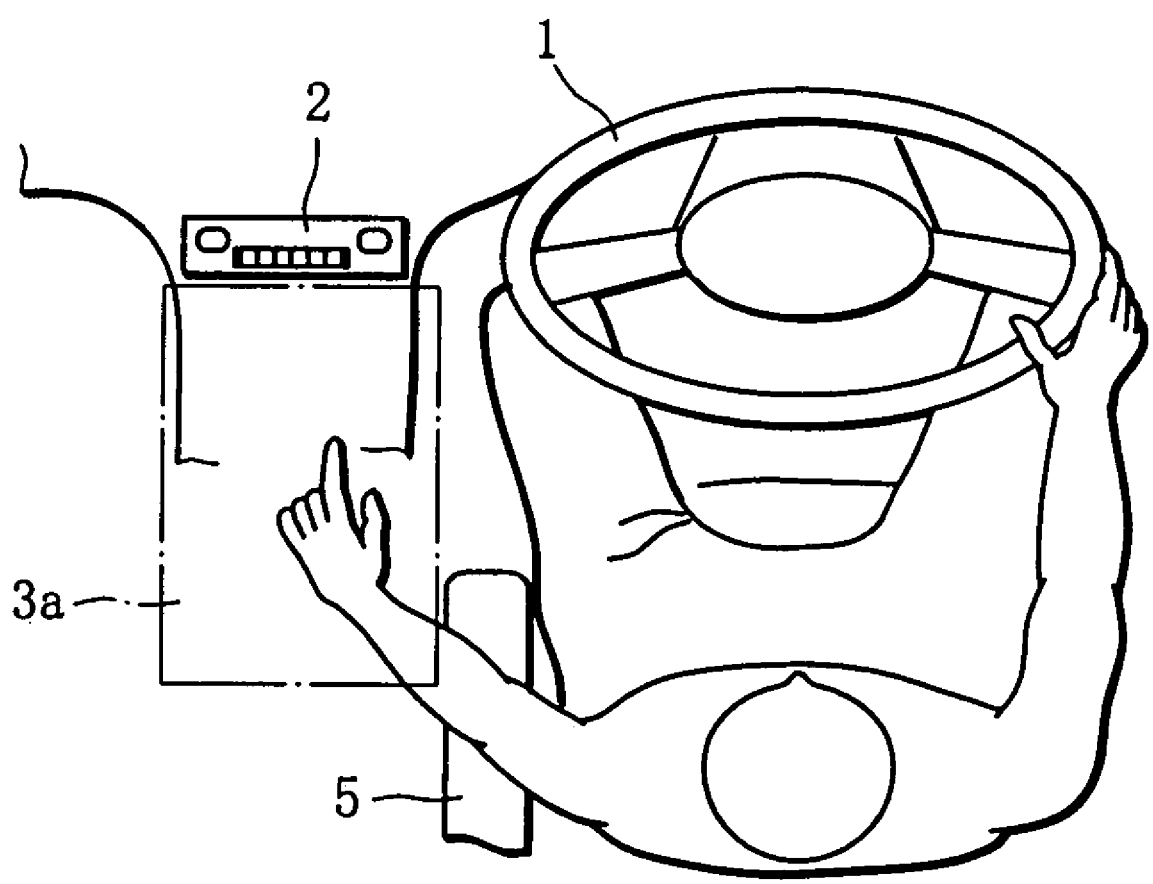
FIG. 2 is a view showing a finger image pickup zone in the hand pattern switch device shown in FIG. 1.

As shown in FIG. 2, the image pickup zone 3a of the camera 3 located laterally to the steering wheel 1 is at least 50 mm, preferably about 100 mm, apart from an outer periphery of the steering wheel 1. And the image pickup zone 3a is rectangle in shape and has a size of about 600 mm in a fingertip direction of and about 350 mm in a width direction of the driver's hand extended laterally to the steering wheel 1.

Since the image pickup zone 3a is set as mentioned above, the driver's hand does not fall within the image pickup zone 3a when the driver holds the steering wheel 1 or operates the combination switch (not shown) provided at a steering column shaft, and the driver can move his/her fingers into the image pickup zone 3a without largely moving the arm. In particular, the driver can extend his/her arm to the image pickup zone 3a, without changing a driving posture, while resting the arm on an arm rest 5 that is provided laterally to the driver's seat. And the image pickup zone 3a is located away from the operating section 2 for audio equipment, etc.

With the above arrangement, a hand motion for a driving operation or for a direct operation of the operating section 2 of the audio equipment, etc. is prevented from being erroneously detected as a switch operation.

If a gearshift lever (not shown) used to operate a transmission is located in the image pickup zone 3a set as described above, a pressure-sensitive sensor for example may be provided in the gearshift lever to make a detection as to whether the gearshift lever is grasped by the driver. The provision of such sensor makes it possible to easily determine which of the gearshift lever or the hand pattern switch device is operated by the driver's hand extended to the image pickup zone 3a, whereby a driving operation is prevented from being erroneously detected as a switch operation. Alternatively, a height of driver's hand (i.e., distance from the camera 3) may be detected by using a stereoscopic camera serving as the camera 3, to determine whether the driver's hand, extended to the image pickup zone 3a, operates the gearshift lever or is present in a space above the gearshift lever.

As mentioned above, the setting of the image pickup zone 3a is made such that the driver can move his/her fingers to this zone, without largely moving the arm. Besides, the image pickup zone is set such that the driver can make a finger motion (displacement) for an imaginary switch operation in this zone, with a reality. When the driver actually operates a switch of audio equipment, etc., a reaction force is produced, and hence the driver has a reality that he/she has made a switch operation. On the other hand, in an imaginary switch operation, the driver simply moves his/her hand in a predetermined space, and no reaction force is produced. Thus, the operator does not have a direct bodily sensation, but has a sensory impression by way of his/her finger motion or hand motion for the imaginary switch operation.

In this connection, the present inventors made experiments to ascertain how much hand motion is required to enable an operator to have a sensory impression that he/she has certainly made an imaginary switch operation, instead of actually operating a push button switch once at a time or instead of actually operating a shift lever in a multi-stage fashion.

In each case, the hand motion is kept stopped for a while to indicate completion of the switch operation. Thus, the present inventors performed further experiments to ascertain how much stop time is required to enable an operator to have a sensory impression that he/she has completed a switch operation.

In these experiments, amounts of hand motion (displacement) and stop time required to provide an operator with sensory impressions that he/she has made a switch operation and has completed such operation were repeatedly measured under the cooperation of operators who have a driver's license for big size vehicle.

Figure 12A:
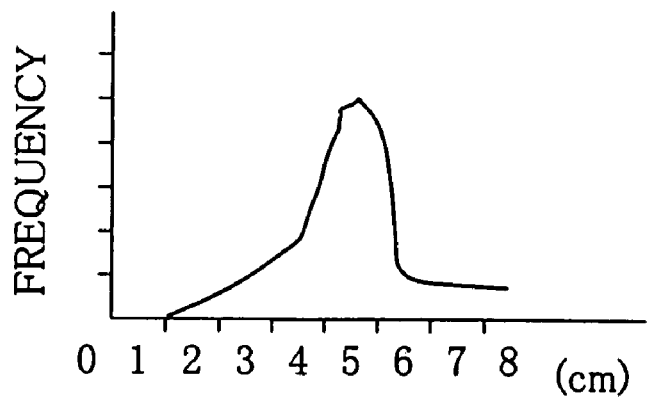
FIG. 12A is a graph showing a relation between amount of finger motion and frequency of an imaginary switch operations of a push button switch performed by drivers with a reality.
Figure 12B:
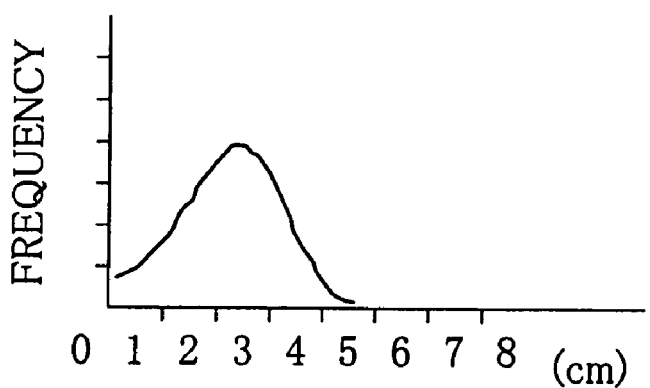
FIG. 12B is a graph showing a relation between amount of finger motion and frequency of imaginary switch operations of a lever switch performed by drivers with a reality.
Figure 12C:
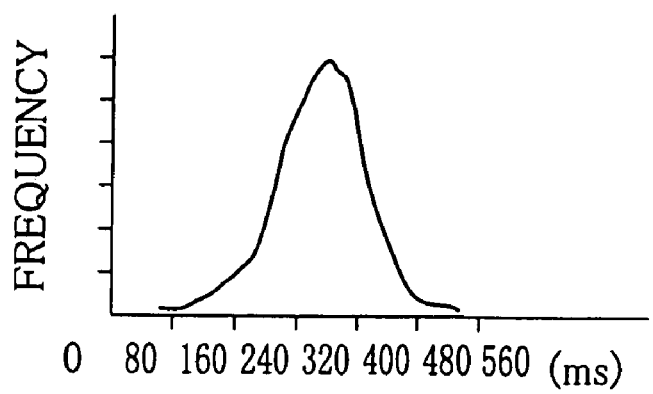
FIG. 12C is a graph showing a relation between stop time and frequency of stoppages of imaginary switch operation performed by drivers with a realty.

FIGS. 12A-12C show results of the experiments. Specifically, FIG. 12A is a graph in which the frequency of imaginary switch operations is shown as a function of amount of hand motion (displacement) with which some operators felt that they had made an imaginary operation that corresponds to a depressing operation of a push button switch. This experimental result indicates that most drivers felt that they had made such a switch operation when moving their hand by 50 mm, although the amount of hand motion (displacement) varies from 30 mm to 70 mm and the average amount is 45 mm.

As for imaginary switch operations corresponding to a back and forth multi-stage operation of a shift lever, most drivers felt that, as shown in FIG. 12B, they had made a one-stage operation when moving their hand by 30 mm although the amount of finger motion (displacement) varies from 10 mm to 40 mm and the average amount is 23 mm. As for a stop time for which an operator stops his/her hand motion, following a predetermined amount of hand motion, to indicate completion of a single switch operation, most drivers felt that they had completed the operation when stopping their hand motion for 320 msec, as shown in FIG. 12C. The stop time was measured in units of 80 msec.

As understood from the experimental results, in a case where a driver makes an imaginary switch operation in a natural state with his/her arm resting on an arm rest, the driver has a sensory impression with a reality (click feeling) that he/she has made the operation when the hand motion is about 50 mm for the single push button switch operation and about 30 mm for the one-stage shift lever operation, and has a sensory impression that he/she has completed the operation when the hand motion is stopped for about 300 msec.

The position and size of the image pickup zone of the camera 3 are determined by taking into account of not only the experimental results but also other conditions: a multi-stage lever switch is typically operated back and forth in five stages; a reference position, at which a driver's hand extended laterally to the steering wheel 1 is initially placed, varies depending on driver's body shape and driving posture; a typical length from a wrist to a fingertip is about 200 mm; and a typical hand width is about 120 mm. As a consequence, the image pickup zone 3a is determined to be a rectangle in shape and to have a 600 mm length and a 350 mm width.

By setting the image pickup zone in the above manner, a driver's hand, coming off the steering wheel 1 and then naturally moved without a sense of incompatibility, can be captured without fail and without a hand motion for a driving operation being erroneously detected. It is also possible to reliably grasp a hand motion for an imaginary switch operation in the image pickup zone which is limited in size, so that pattern recognition of a hand and detection of an amount of hand motion (deviation) can easily be made with relatively simplified image processing.

For the driver, he/she can perform a desired imaginary switch operation by simply moving his/her hand after forming a predetermined hand pattern, while extending his/her arm laterally to the steering wheel 1 without changing a driving posture and without directly touching the operating section 2 for audio equipment, etc.

This reduces a load of the driver performing a switch operation. In addition, since a hand motion and/or an arm motion for a driving operation cannot erroneously be detected as an imaginary switch operation, the driver can concentrate on driving without paying attention to the hand pattern switch device, and can, where required, give instruction for switch operation by simply moving his/her hand to the image pickup zone 3a.

[Data Processing Section]

Basically, the microcomputer (ECU) of the hand pattern switch device performs the processing to recognize a driver's hand pattern or hand motion on the basis of an image picked up by the camera 3, and acquires operation information (switch-operation information) for a controlled object such as audio equipment or air conditioner equipment, based on results of the recognition. Thus, the hand pattern switch device serves, instead of the operating section 2, to provide switch-operation information to the audio equipment, air conditioner equipment, etc.

More specifically, as shown mainly in FIG. 1, the hand pattern switch device comprises the camera 3 serving as image pickup means, the microcomputer (ECU) for acquiring switch-operation information from the image picked up by the camera 3, and the like.

The ECU comprises a binarization processing section 11 for finally binarizing an input image (hereinafter referred to simply as input image) which is input from the camera 3 to the microcomputer (ECU), so that background image components are removed to extract a hand image from the picked-up image; a pattern recognition section 12 for recognizing a hand pattern from the hand image extracted by the binarization processing; a centroid detecting section 13 for determining a centroid position of a hand based on the recognized hand pattern; and an instructed-operation recognizing section 14 for recognizing a switch-operation information given by the driver by his/her hand pattern or hand motion, based on results of recognition by the pattern recognition section 12 and the centroid position of the hand detected by the centroid detecting section 13.

This instructed-operation recognizing section 14 generally comprises a pattern determination section 16 for determining and identifying a hand pattern, referring to hand patterns registered beforehand in a memory 15, a displacement detecting section 17 for tracing a motion of centroid position of a hand to detect a displacement of the hand, and a timer 18 for monitoring a time that has elapsed with hand motion. Preferably, a palm portion of the hand is subject to the centroid position detection, moved amount monitoring, and elapsed time monitoring.

The instructed-operation recognizing section 14 is arranged to determine information on predetermined switch-operation information specified by the driver's hand pattern and/or hand motion, and output the information to the audio equipment, air conditioner equipment, or the like.

Further, the instructed-operation recognizing section 14 is provided with a guidance section 19 that provides a predetermined guidance (announcement) to the driver according to results of the aforementioned determination, etc. The driver is notified of the guidance in the form of a speech message that specifies for example the audio equipment or air conditioner equipment (controlled object equipment), or volume/channel setting, wind volume/temperature, or the like (controlled object function), or in the form of confirmation sound such as beep tone or blip tone that identifies a switch operation having been made.

Figure 3:
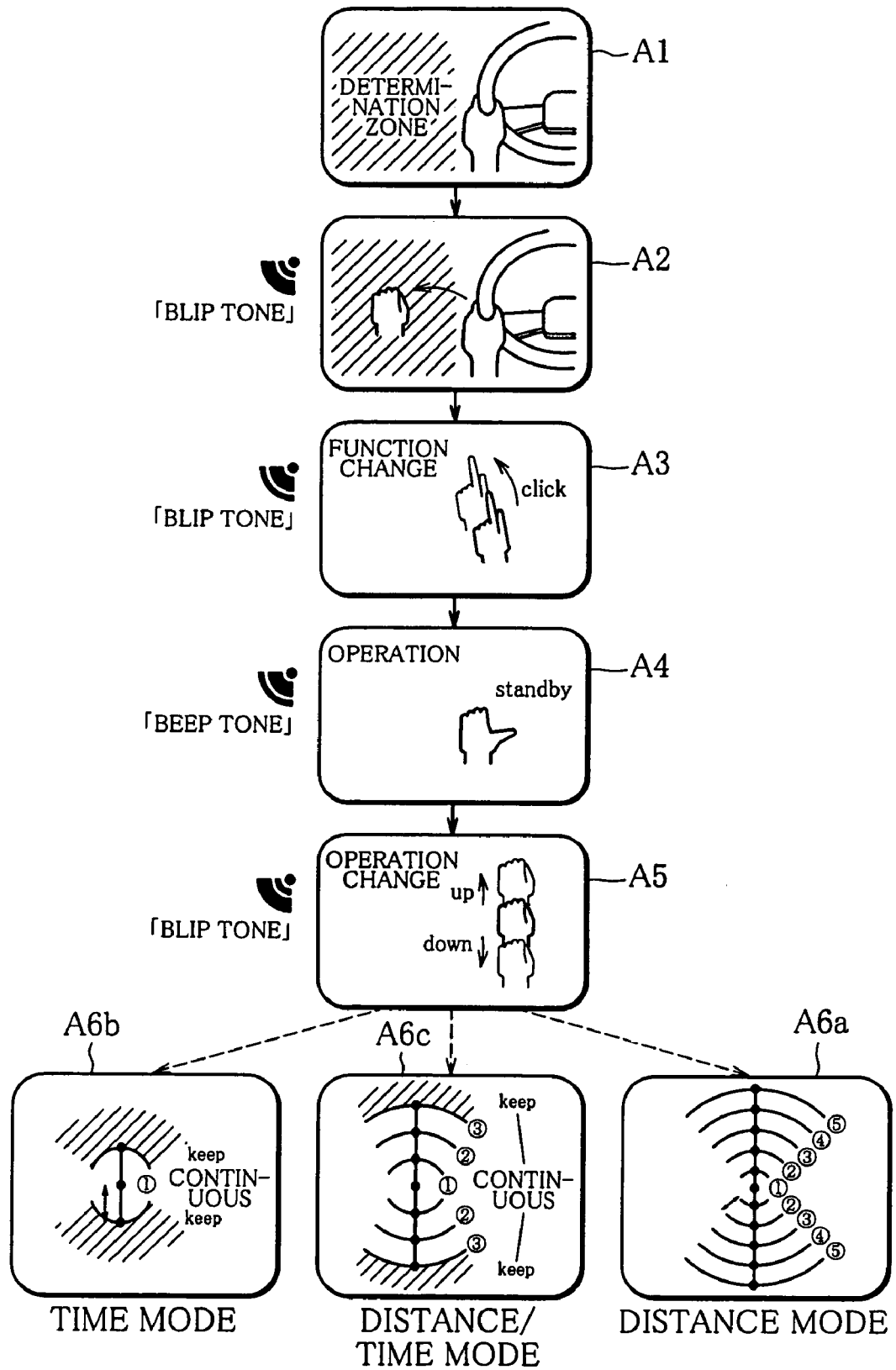
FIG. 3 is a view showing a general procedure of operations of inputting switch-operation information in the hand pattern switch device.

One of features of the hand pattern switch device constructed as described above is to change input mode for inputting switch-operation information to controlled object in accordance with which one of the controlled objects is selected, as shown for example by switch operations in FIG. 3. To this end, three types of input modes, namely, distance mode, time mode, and distance/time mode, are provided so that an appropriate one of which may be selected depending on the selected controlled object (vehicle-mounted equipment).

[Outline of Hand Pattern Switch Operation]

Next, the switch operation will be described.

Figure 4A:
FIG. 4A is a view showing an example of finger pattern used to give instruction on switch operation to the hand pattern switch device.
Figure 4B:
FIG. 4B is a view of another example of finger pattern.
Figure 4C:
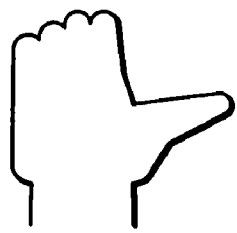
FIG. 4C is a view of a further example of finger pattern.

In the hand pattern switch device, finger patterns shown in FIGS. 4A-4C are used as hand patterns each specify a corresponding switch operation. Specifically, a clenched-fist type pattern (hand pattern 1) shown in FIG. 4A, a forefinger-up type pattern (hand pattern 2) shown in FIG. 4B, and a thumb-up type pattern (hand pattern 3) shown in FIG. 4C are used.

The forefinger-up type pattern (hand pattern 2) is intended to express image of depressing a switch such as a push button. The clenched-fist type pattern (hand pattern 1) describes image of grasping a lever switch, such as a shift lever used to change the transmission stage of an automatic transmission, and shifting it back and forth. The thumb-up type pattern (hand pattern 3) describes image of standby instruction. These hand patterns are registered beforehand in the memory 15 in the form of data representing their features of patterns. The patterns are used to make a hand pattern determination in which a degree of conformity (similarity) is calculated between a hand pattern recognized from an input image and each individual pattern registered in the memory 15.

When the driver grasps the steering wheel 1 to drive the vehicle, driver's hands fall outside the image pickup zone 3a as shown by operation state A1 in FIG. 3. The input image at that time only includes background image components that will be removed, so that the hand pattern switch device does not operate. On the other hand, when a driver's hand comes off the steering wheel 1 and enters the image pickup zone 3 as shown by operation state A2, the processing for hand pattern recognition starts. At that time, it is preferable that the driver clenches his/her fist to form hand pattern 1, i.e., clenched-fist pattern, thereby indicating his/her intention to start switch-operation information input.

Then, a determination is made as to whether the hand pattern is changed to the forefinger-up pattern (hand pattern 2) to make an operation of depressing a switch. If the forefinger-up pattern (hand pattern 2) is detected, detection of a hand motion starts, assuming that a depressing operation of a selected switch is repeated as shown in operation state A3 in order to selectively specify a desired function/equipment. Specifically, a change in the centroid position of the hand (i.e., a hand motion) is detected to thereby detect a back and forth motion of fingers with the forefinger-up pattern, whereby push operations are detected.

Figure 5:
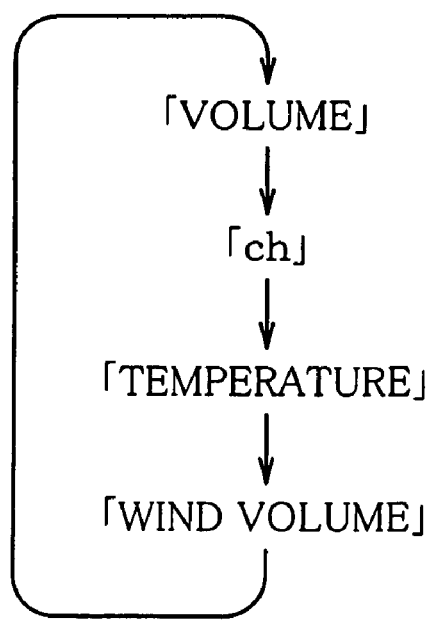
FIG. 5 is view showing an example of controlled object selection by a push operation with fingers.

In this connection, a control algorithm may be used, in which, each time a push operation is detected, a selectable controlled object is specified in a cycle from sound volume to channel, to temperature, and to wind volume, etc., as shown by way of example in FIG. 5.

In addition, each time a push operation is detected, it is useful to output confirmation sound such as blip tone or a sound message to notify the driver of the controlled object that can be selected or is selected. With such guidance, the driver can recognize a state of switch operation while concentrating on driving, without the need of visually confirming the switch operation.

When the desired controlled object is selected, the hand pattern is changed to a different pattern, e.g., to the thumb-up pattern (hand pattern 3) as shown for example in operation state A4, to indicate an intention of completing the selection of function and indicate an intention to start to input a switch operation amount. At this time, it is preferable that confirmation sound such as beep tone different from the aforesaid one is produced.

Subsequently, the hand pattern is changed to the clenched-fist pattern (hand pattern 1) as shown in operation state A5, and the hand with hand pattern 1 is moved back and forth to input switch-operation information. At this time, a hand motion with hand pattern 1 is detected based on a deviation of the centroid position of the hand or the like, and switch-operation information corresponding to such hand motion is output.

Specifically, at the time of inputting the switch-operation information, information content to be detected is changed in accordance with the controlled object selectively specified by the push operation.

In general, controlled objects can be classified into two. One is that whose amount of control (switch-operation information) is preferably changed in a multi-stage fashion (stepwise) with a large increment of change, and another one is that which is preferable to be changed continuously and finely with a small increment of change.

In this regard, depending on the selected controlled object, a corresponding one of the following input modes is selectively set: a distance mode (operation state A6a) where an amount of motion (displacement) of the hand is input as the switch-operation information; a time mode (operation state A6b) where the switch-operation information is determined based on a stop time of the hand which has until then been moved by a predetermined distance or more; and a distance/time mode (operation state A6c) where these two modes are used in combination.

The distance mode is a mode for outputting the switch-operation information that varies in a multi-stage fashion in accordance with a moved distance of the hand from a reference position, and is suitable for channel selection on radio broadcasting or for selection of wind amount/wind direction of air conditioner equipment.

The time mode is a mode for outputting the switch-operation information varying depending on a stop time of the hand that has until then been displaced from a reference position, and is suitable for example for adjustment of sound volume of audio equipment and for adjustment of temperature of air conditioner equipment.

The distance/time mode is a mode in which the switch-operation information determined according to an amount of hand motion is output when the hand is moved slightly, whereas the information determined according to a stop time of the hand at a stop position is output when the hand has been moved by a predetermined distance or more to the stop position.

The distance/time mode is suitable for example for controlled objects that are subject to a fine adjustment after being roughly adjusted.

In accordance with the input mode (distance mode or time mode or distance/time mode) selectively set according to the controlled object, the instructed-operation recognizing section 14 traces a hand motion in the image pickup region 3a, measures an amount of hand motion (amount and direction of displacement) or a stop time of the hand which stops moving, and outputs the switch-operation information that varies depending on measurement results.

Figure 6:
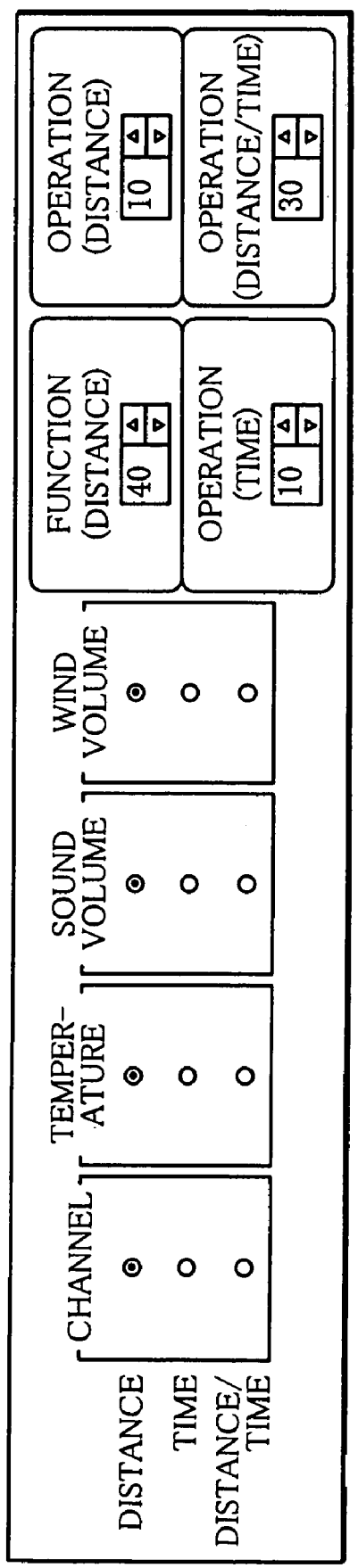
FIG. 6 is a view showing an example of an input mode setting screen used to set input modes corresponding to controlled objects.
Figure 7:
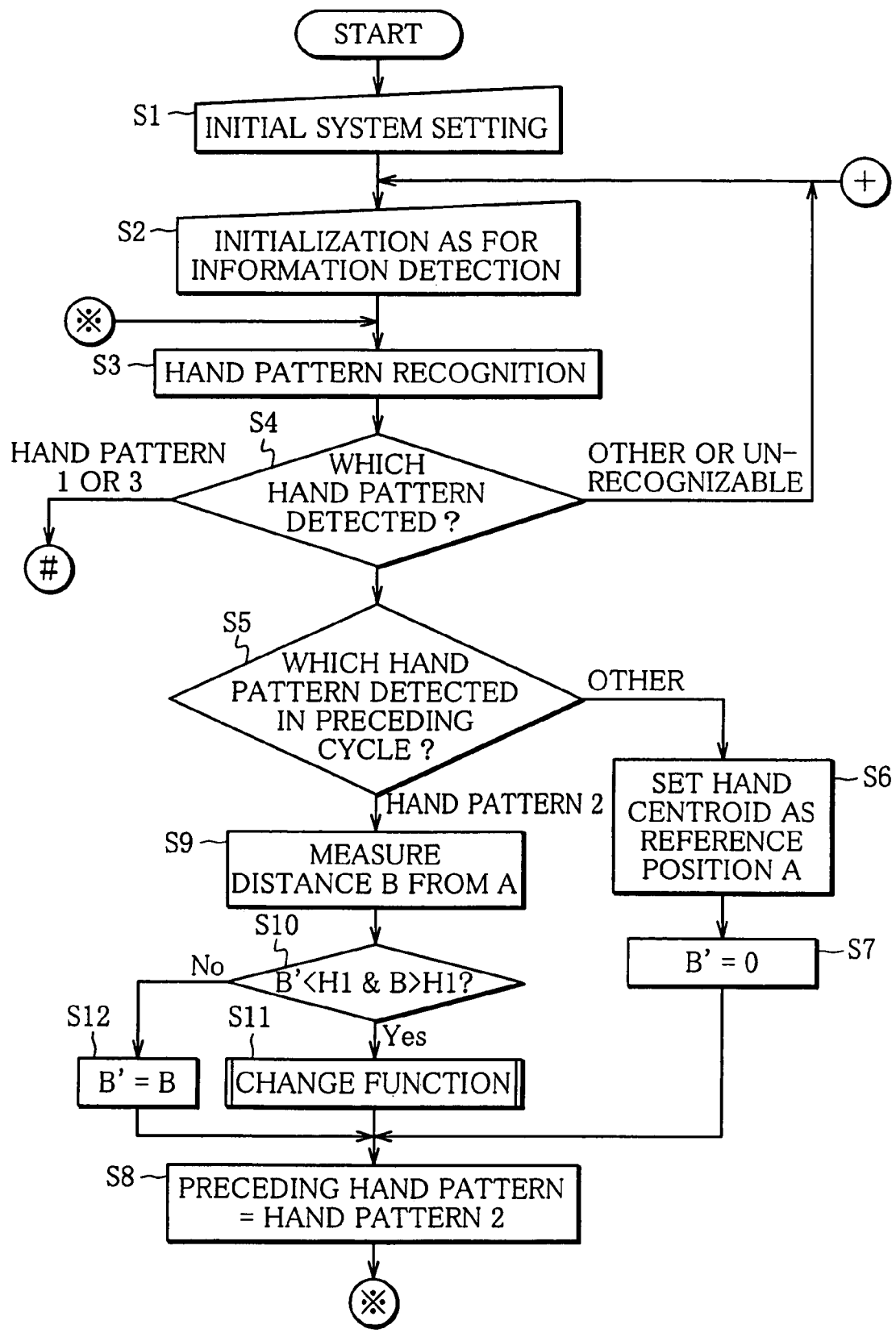
FIG. 7 is a flowchart showing part of processing procedures for switch-operation information input in the hand pattern switch device.

A relation between various controlled objects in switch operation and input modes and/or information content (such as distance, time) to be detected in the detection of switch operation amount may be fixedly set in advance. Alternatively, the relation, distance, time, etc. may be made changeable in accordance with the preference of the switch operator (driver), etc. by using for example a control display screen 14a shown in FIG. 6 that is provided in the instructed-operation recognizing section 14.

More specifically, which input mode should be used to input the switch-operation information may selectively be set for each individual controlled object. And the displacement (moved distance) of hand, measurement time, etc., serving as detection unit, may variably be set.

[Flowcharts]

(i) Initial Determination

FIGS. 7-11 show a general processing procedure performed by the instructed-operation recognizing section 14 to realize the aforementioned processing functions.

In the processing procedure, upon start of operation of the hand pattern switch device, initial system setting is performed that includes setting of an image pickup zone (recognition zone) of the camera 3, setting of a threshold value for binarization processing, etc. (step S1).

Then, initialization as for the detection of switch-operation information is performed, in which parameter values used for hand pattern recognition and hand motion measurement are cleared, and a control flag is set to a value of 0 (step S2).

After completion of the initialization, a hand pattern in an input image is recognized (step S3).

Then, a determination is made as to whether the recognized hand pattern corresponds to hand pattern 1, 2 or 3 (step S4).

If the hand pattern corresponds to hand pattern 2 of forefinger-up type, which hand pattern was detected in the preceding cycle is determined (step S5).

If the preceding hand pattern is other than hand pattern 2 of forefinger-up type, it is determined based on the currently detected hand pattern 2 that a function selection mode is set, and a hand centroid position detected at that time is registered as a reference position A (step S6).

Then, a parameter B' representing a displacement of the hand detected in the preceding cycle and used to manage the moved distance of the hand is set to a value of 0 (step S7).

Then, the preceding hand pattern is renewed to hand pattern 2 (step S8).

Whereupon, the processing of step S3 and subsequent steps is repeatedly executed.

On the other hand, if it is determined at step S5 that the preceding hand pattern is the forefinger-up type hand pattern 2, a deviation (moved amount) B of a hand centroid position detected at that time from the reference position A is determined (step S9).

Next, a further determination is made as to whether the following two conditions are satisfied. A first one is that the parameter B' is less than a determination threshold value H1, and a second one is that a currently detected displacement (moved amount) B exceeds the predetermined detection threshold value H1 (step S10).

If these two conditions are satisfied, it is determined that a push operation in hand pattern 2 is made for function selection, so that a one-stage change in controlled object is performed (step S11).

Then, the preceding hand pattern is renewed to hand pattern 2 (step S8), and the processing of step S3 and subsequent steps is repeatedly executed.

If the two conditions are not satisfied at step S10 for the reason for example that the displacement B does not exceed the predetermined determination threshold value H1, the displacement B is set as the parameter B' (step S12).

Then, the processing starting from step S3 is repeatedly executed.

As a result of the processing of steps S3-S8 being executed, when a push operation is made by a predetermined move amount with hand pattern 2, the function selection is made to selectively set the controlled object concerned.

Figure 8:
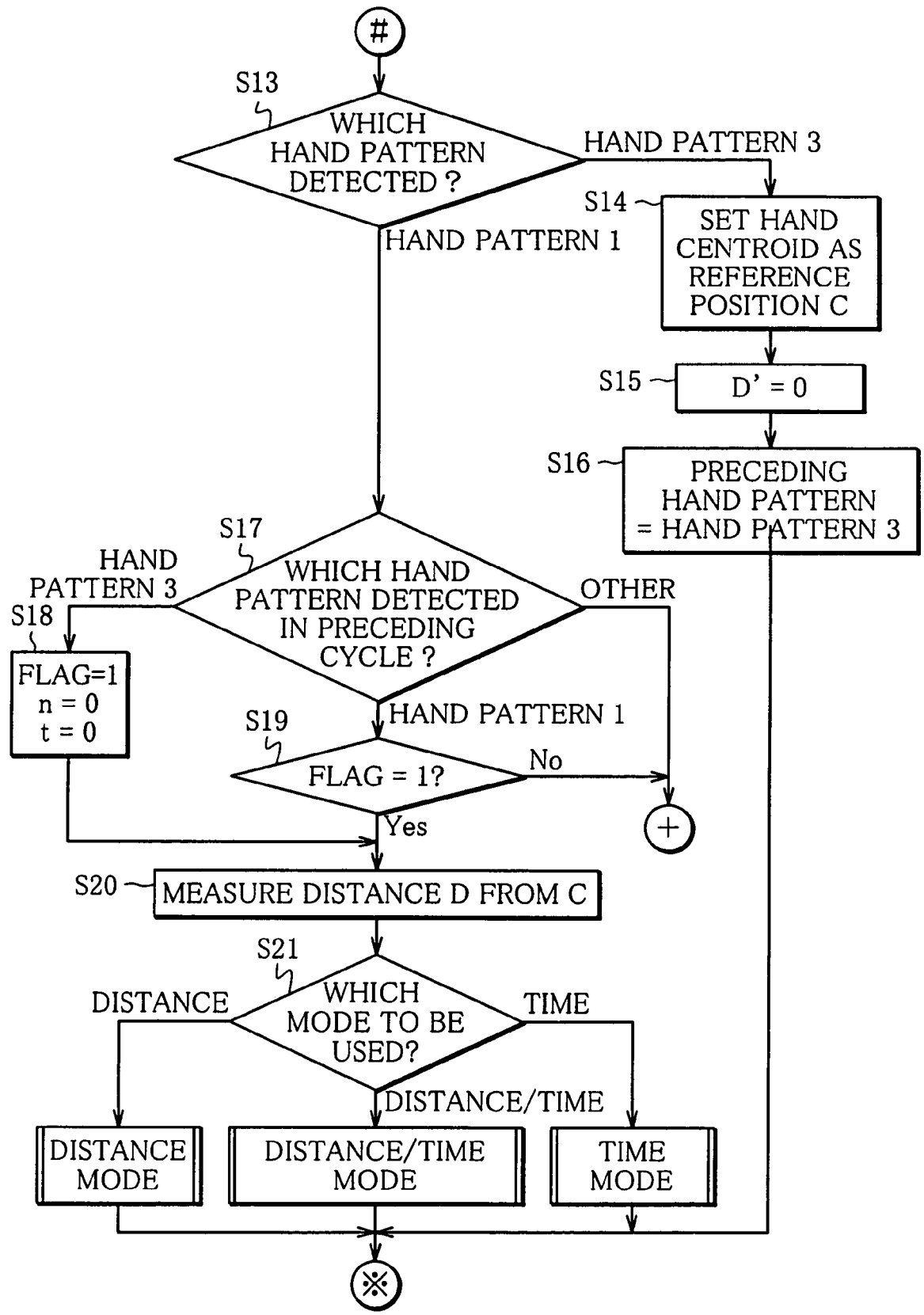
FIG. 8 is a flowchart showing processing procedures that follow the procedures shown in FIG. 7.

On the other hand, if it is determined at step S4 that the recognized hand pattern corresponds to hand pattern 1 or 3, a further determination is made as to which of hand patterns 1 and 3 corresponds to the recognized hand pattern, as shown in FIG. 8 (step S13).

If the hand pattern corresponds to hand pattern 3, it is determined that an operation await state is specified, so that a hand centroid position detected at that time is registered as a reference position C (step S14).

At the same time, a control parameter D' used for moved distance measurement, mentioned later, is set to a value of 0 (step S15).

Subsequently, the preceding hand pattern is renewed to hand pattern 3 (step S16), and the processing starting from step S3 is repeatedly executed.

On the other hand, if it is determined at step S13 that the recognized hand pattern corresponds to hand pattern 1, the hand pattern detected in the preceding cycle is determined (step S17).

If the preceding hand pattern corresponds to hand pattern 3, it is determined that the setting of operation information input mode is performed, so that the control flag is set to 1 and parameters n and t for moved distance measurement and stop time measurement are set to 0 (step S18).

If the preceding hand pattern is the clenched-fist type hand pattern 1, whether the control flag is at 1 is determined to thereby determine whether an operation information input mode has already been set (step S19).

If the control flag is at 1, a distance D between a hand centroid position detected at that time and the reference position C is detected (step S20).

In accordance with the controlled object having been selected by the function selection, a determination is made as to which one of the three input modes should be used for the detection of switch-operation information (step S21).

Whereupon, the processing of detection of switch-operation information is performed in accordance with the determined input mode.

If the preceding hand pattern does not correspond to hand pattern 1 or 3 (step S17), or if the control flag is not at 1 (step S19), the processing procedure starting from the initial setting' at step S2 is repeatedly executed.

As a result of this processing, instruction is provided to start the input of switch-operation information. This corresponds to operation state A2.

(ii) Distance Mode

Figure 9:
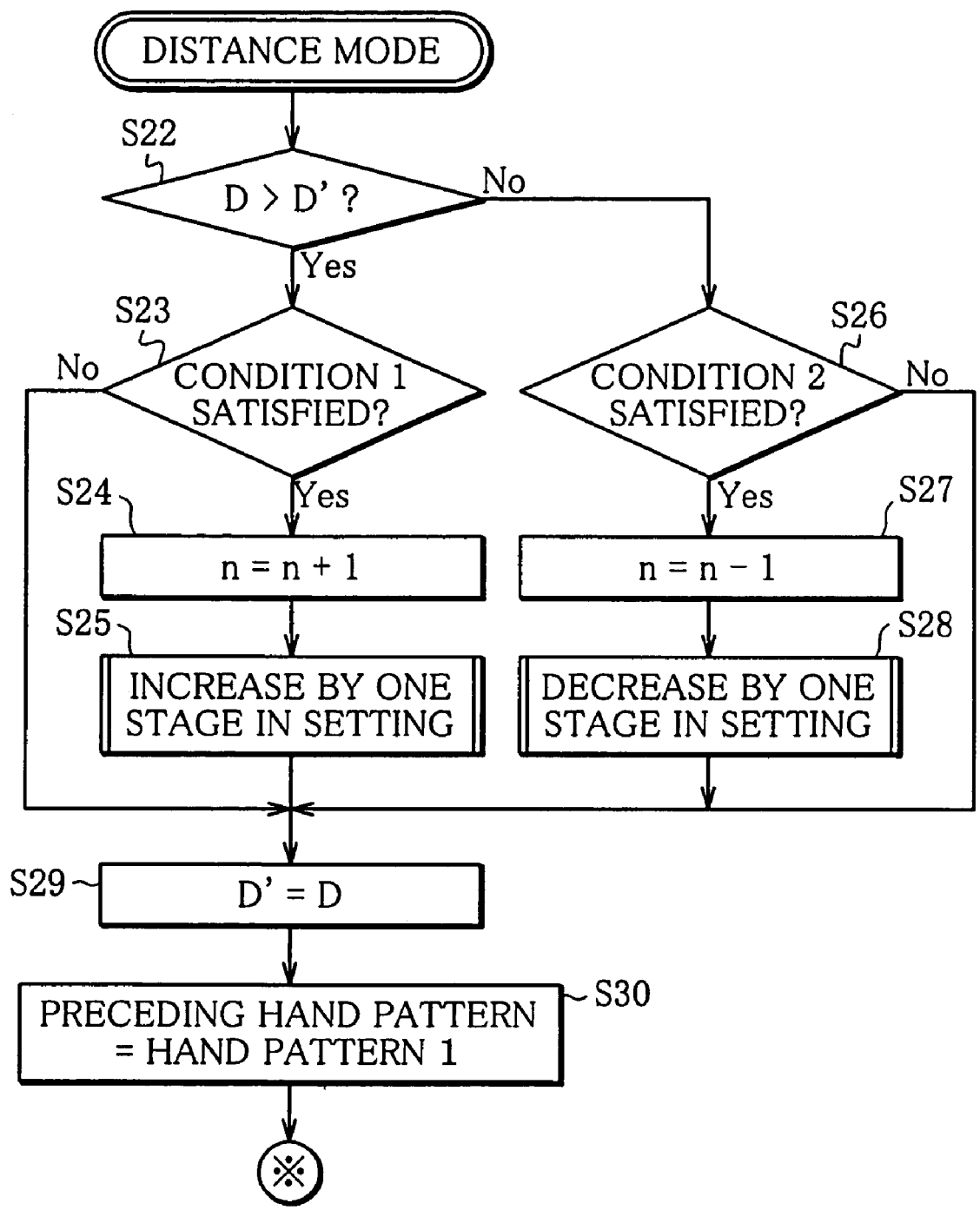
FIG. 9 is a flowchart showing procedures for detection of switch-operation information in a distance mode.

As shown by way of example in FIG. 9, in the processing to detect switch-operation information in the distance mode, a distance D from the reference position C is compared with a value of control parameter D' (step S22), and in accordance with a relation in size therebetween, whether the hand is advancing or retreating is determined.

When the hand is being advanced, whether the moved distance from the preceding cycle to the present cycle exceeds a predetermined measurement unit distance is determined. In other words, whether the later-mentioned condition 1 is satisfied is determined (step S23).

If the measurement unit distance is exceeded, the control parameter n is incremented (step S24).

Then, a one-stage increase is made in the setting of controlled object (switch-operation information) (step S25).

Conversely, if the hand is being retreated, whether the moved distance from the preceding cycle to the present cycle exceeds the predetermined measurement unit distance is determined. In other words, whether the later-mentioned condition 2 is satisfied is determined (step S26).

When the moved distance exceeds the measurement unit distance, the control parameter n is decremented (step S27).

Then, the setting (switch-operation information) is decreased by one stage (step S28).

The condition 1 is satisfied when a difference between distances D and C (moved amount) exceeds a moved distance corresponding to a predetermined number of steps that is variably set by the control parameter n, but a difference between distances D' and C (moved amount) is less than the moved distance corresponding to the predetermined number of steps variably set by the control parameter n.

In other words, the condition 1 is used to determine whether the hand has moved by the predetermined measurement unit distance or more that is determined by the predetermined number of steps. The condition 2 is similar to the condition 1, but used for a case where the hand moves in the opposite direction (retreat).

After the switch-operation information corresponding to the moved distance of the hand has been obtained in the above manner, the distance D is registered as the control parameter D,', whereby the determination reference is renewed (step S29).

Then, hand pattern 1 is registered as the preceding hand pattern (step S30).

Whereupon, the processing from step S3 is resumed.

By repeatedly executing the processing, the switch-operation information depending on the moved amount of the hand is output step by step.

(iii) Time Mode

Figure 10:
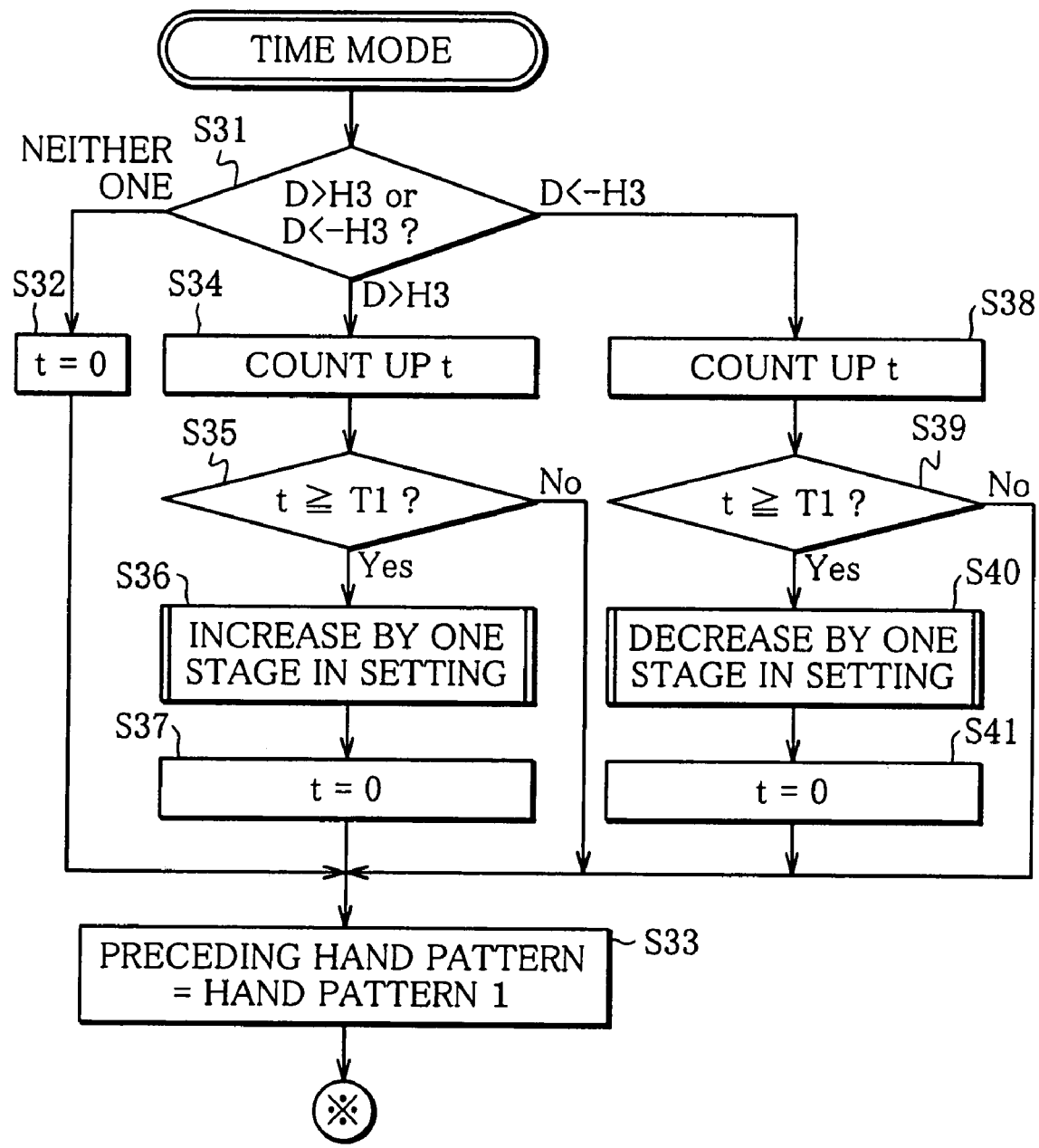
FIG. 10 is a flowchart showing procedures for switch-operation information detection in a time mode.

On the other hand, if the time mode is set, the detection processing is executed in accordance with procedures shown by way of example in FIG. 10. In this case, whether the moved distance D has exceeded a third threshold value H3 is determined (step S31).

If the third threshold value H3 is not reached, a time parameter t is set to 0 (step S32).

Then, hand pattern 1 is registered as the preceding hand pattern (step S33).

Whereupon the processing starting from step S3 is resumed.

If it is determined at step S31 that the moved distance D exceeds the third threshold value H3, the time parameter t is counted up (step S34).

And a determination is made as to whether the counted-up time parameter t reaches a reference time T1 (step S35).

If the time parameter t equal to or larger than T1 is determined, the setting (switch-operation information) is increased by one stage (step S35).

Then, the time parameter t is reset to 0 (step S37).

Further, hand pattern 1 is registered as the preceding hand pattern (step S33).

Whereupon, the processing from step S33 is resumed.

If it is determined at step S31 that the moved distance D exceeds the third threshold value H3 in the opposite direction, the time parameter t is counted up (step S38).

Then, whether the counted-up time parameter t reaches the reference time T1 is determined (step S39).

When the time parameter t equal to or larger than T1 is determined, the setting (switch-operation information) is decreased by one stage (step S40).

Then, the time parameter t is reset to 0 (step S41).

Further, hand pattern 1 is registered as the preceding hand pattern (step S33).

Whereupon, the processing from step S3 is resumed.

By means of such a series of processing, when the hand has moved by a predetermined distance and stops there, the switch-operation information is output in accordance with the stop time.

(iv) Distance/Time Mode

The distance/time mode is executed, while selectively using the processing in the distance mode or the processing in the time mode in accordance with the moved distance of the hand.

Specifically, as shown in FIG. 11, a value of the control parameter n is determined (step S42).

Depending whether the parameter value n falls within a range from −2 to 2, or is equal to or larger than 3, or equal to or less than −3, the processing in the distance mode from step S22*a* to step S33*a* or the processing in the time mode from step S24*a* to S41*a* is executed.

The processing from step S22*a* to step S33*a* corresponds to the processing from step S22 to step S33. The processing from step S24*a* to step S41*a* corresponds to the processing from step S24 to step S41.

According to the hand pattern switch device having the above described functions, it is possible to easily and effectively select equipment to be controlled, selectively set the input mode suitable for the selected controlled object, and input the switch-operation information to the selected controlled object.

Thus, an amount of switch operation suitable to the controlled object can be input easily both in a case where wind amount or wind direction is selected as the controlled object which is set preferably by providing a relatively large displacement, and in a case where sound volume or temperature is selected which is preferably subject to a fine adjustment that is performed by providing a relatively small displacement.

In particular, by setting the input mode beforehand depending on the controlled object, practical advantages can be attained such that appropriate switch-operation information can be easily input according to the intent of operation.

By variably setting the unit distance and unit time for detection, etc., the setting can be made in a manner suitable for the body shape, preference, habit of the switch operator (driver).

Also, the setting suitable for equipment characteristics of controlled objects can also be achieved. This makes it possible to realize a hand pattern switch device capable of reducing operation load and easy to operate.

Furthermore, according to the hand pattern switch device constructed as mentioned above, switch-operation instruction based on hand pattern and hand motion can be detected easily, effectively and reliably, without being affected by a hand motion for a driving operation, and in accordance with results of the detection, switch-operation information can be provided properly to the desired vehicle-mounted equipment. In particularly, the operation load to the driver can be reduced since the image pickup zone 3*a* in which an image of the hand to give the switch-operation instruction is captured is located laterally to the steering wheel 1 within a range to which the driver can naturally extend his/her arm without changing a driving position. Therefore, practical advantages can be achieved such that the driver is enabled to easily give an instruction to input the switch-operation information through the hand pattern switch device in much the same way that he/she directly operates the operating section 2 of audio equipment, etc.

The present invention is not limited to the foregoing embodiment. In the embodiment, explanations have been given under the assumption that this invention is applied to a right-steering-wheel vehicle, but it is of course applicable to a left-steering-wheel vehicle. This invention is also applicable to an ordinary passenger car other than a large-sized car such as truck. As for the controlled object, expansions can be made to operation of navigation device, wiper on/off control, adjustment of interval of wiper operation, side mirror open/close control, etc.

As for the size of the image pickup zone 3*a*, it may be variably set, utilizing a zooming function of the camera 3, for instance. Further, the position of the image pickup zone 3*a* may be subject to fine adjustment so as to meet the habit of individual driver, etc. To this end, the mount angle of the camera 3 may be adjusted.

Furthermore, the switch-operation information input mode is not limited to the aforementioned three types, but an additional mode may be provided in which a hand pattern per se is input as switch-operation information. In the embodiment, sound volume, channel, temperature, wind amount are directly selected as controlled objects. Alternatively, a controlled object equipment such as radio broadcast receiver, tape player, CD player, air conditioner, or the like may be specified. Then, a controlled object may be specified such as sound volume, channel, play, or stop function of audio equipment, or wind amount, wind direction, or temperature function of air conditioner equipment.

In this case, the manner of detection of switch-operation information may be variably set in accordance with the finally specified controlled object.

In other respects, the present invention may be modified variously, without departing from the scope of invention.

What is claimed is:

1. A hand pattern switch device comprising:
   image pickup means for picking up an image of a hand that is within a predetermined image pickup zone and recognizing a hand pattern therefrom and for detecting a hand motion from the picked-up image to obtain operation information for controlled objects;
   controlled object selecting means for selecting one of the controlled objects in accordance with at least one of the recognized hand pattern or a hand motion; and
   detection mode selecting means for selecting one of a plurality of prescribed detecting modes as a mode of detecting the operation information based on the hand motion in dependence with the controlled object selected by the controlled object selecting means; and
   instructed-operation recognizing section for controlling the controlled object selected by the controlled object selecting means based on the operation information detected with the detecting mode selected by the detection mode selecting means,
   wherein said plurality of prescribed detecting modes include:
   a moved distance detecting mode for detecting a moved distance of the hand in the image pickup zone, and
   a stop time detecting mode for detecting a period of stop time of the hand held at a stop position after the hand has been moved by a predetermined distance or more in the image pickup zone.

2. The hand pattern switch device according to claim 1, wherein said controlled object selecting means cyclically selects one of the controlled objects each time a predetermined hand motion pattern is detected.

3. The hand pattern switch device according to claim 1, wherein the moved distance detecting mode is a mode in which the moved distance of the hand is detected in multi-stage fashion using a predetermined moved distance as a unit of detection.

4. The hand pattern switch device according to claim 1, wherein the image pickup zone is located laterally to a steering wheel of a vehicle to enable an arm of a driver steering the steering wheel to extend without changing a driving posture of the driver.

5. The hand pattern switch device according to claim 4, wherein the image pickup zone is at least 50 mm apart from an outer periphery of the steering wheel, the image pickup zone being a rectangle in shape and having a size of about 600 mm in a fingertip direction and about 350 mm in a width direction of the drivers hand which is extended.

6. The hand pattern switch device according to claim 5, wherein the detection of the hand motion in the image pickup zone includes detecting a 10 mm to 70 mm displacement of a centroid position of the hand, determined from the picked-up image, as at least one of a controlled object selection or an amount of operation of the controlled object.

7. A hand pattern switch device according to claim 1, wherein the image pickup means is disposed at a location for picking up an image of a zone to which an arm of a driver steering a steering wheel of a vehicle extends without changing a driving posture of the driver.

8. The hand pattern switch device according to claim 7, wherein said image pickup means is disposed at a ceiling of the vehicle.

9. A hand pattern switch device according to claim 1, wherein:
   said controlled object selecting means cyclically selects one of the controlled objects when a predetermined hand motion pattern is repeated, and
   said instructed-operation recognizing section includes operation amount changing means for changing an amount of operation of the selected controlled object in accordance with the predetermined hand motion pattern.

10. The hand pattern switch device according to claim 9, further including:
    operation start recognizing means for recognizing that an operation of said hand pattern switch device is started when the recognized hand pattern corresponds to a predetermined first hand pattern,
    wherein said controlled object selecting means selects a controlled object among the controlled objects in accordance with a motion of the hand when a recognized hand pattern corresponds to a predetermined second hand pattern, after said operation start recognizing means recognizes that the operation of said hand pattern switch device is started.

11. The hand pattern switch device according to claim 10, wherein said operation start recognizing means includes confirming means for confirming that the hand of the predetermined first hand pattern does not grasp or touch a particular object and said operation start recognizing means determines that the operation of said hand pattern switch device is started after confirming that the hand of the predetermined first hand pattern does not grasp or touch the particular object.

12. The hand pattern switch device according to claim 10, wherein the predetermined first hand pattern corresponds to one that is formed when the hand grasps an object, and the predetermined second hand pattern corresponds to one that is formed when the hand points an object with its finger.

13. The hand pattern switch device according to claim 10, further including promoting means for promoting start of the operation amount changing means when the recognized hand pattern corresponds to a predetermined third hand pattern and a detected position of the hand in the image pickup zone is not displaced for a predetermined time after the controlled object is selected.

* * * * *